United States Patent Office 3,132,533
Patented May 12, 1964

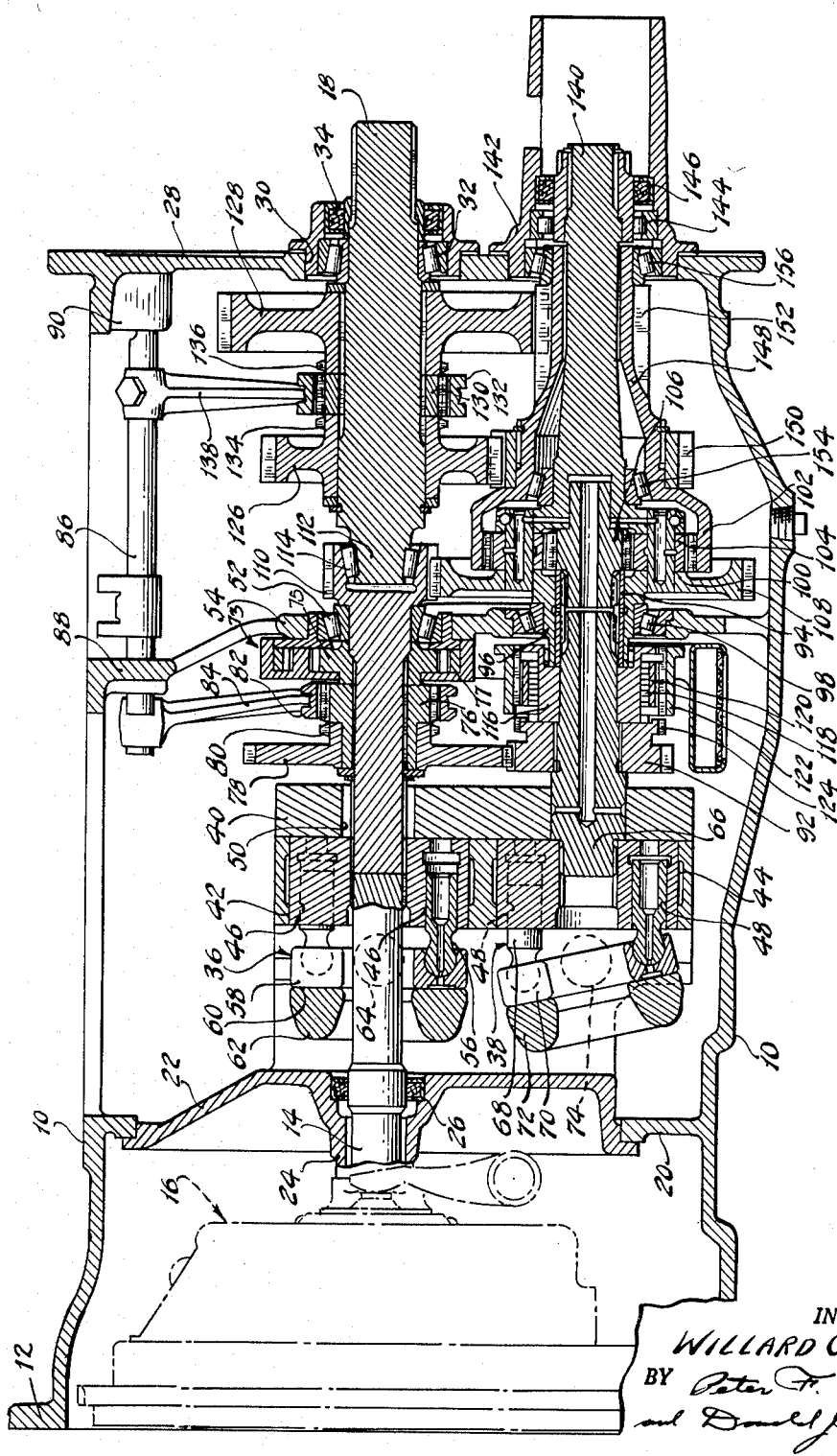

3,132,533
INFINITELY VARIABLE, GEARED HYDROSTATIC POWER TRANSMISSION MECHANISM
Willard C. Baker, Columbus, Ohio, assignor to Ford Motor Company, Dearborn, Mich., a corporation of Delaware
Filed Nov. 18, 1960, Ser. No. 70,298
14 Claims. (Cl. 74—687)

My invention relates generally to a new and improved power transmission mechanism, and more particularly to a power transmission mechanism employing both gear elements and hydrostatic components that are capable of establishing a split power delivery path extending from a driving member to a driven member.

The transmission mechanism of my invention is characterized by an infinitely variable over-all speed ratio, and means are provided for conveniently controlling the magnitude of the speed ratio as desired.

I contemplate that my improved transmission mechanism can be used in the power delivery gear train of a farm tractor. It embodies a constant speed power take-off drive that is comprised in part of the same gear elements which constitute the torque delivery path extending to the traction wheels of the tractor. The speed ratio of the main torque delivery path can be varied between established ratio limits by suitably controlling the relative displacement of the hydraulic units. The provision of such a mechanism is one of the objects of my invention.

The gear elements of the mechanism establish either a high speed ratio range or a low speed ratio range, and at one relative displacement of the hydraulic units the torque transmitting path between the driving and driven members is wholly mechanical. This condition is associated with a definite, predetermined value of the over-all speed ratio for each range. This ratio can be varied in magnitude from the predetermined value by means of the hydraulic units and the controls therefor to produce a range of ratios both greater than and less than that predetermined value. The provision of such an arrangement is thus another object of my invention.

It is a further object of my invention to provide a mechanism of the type above described wherein the mechanism can be conditioned for reverse drive by appropriately adjusting the displacements of the hydrostatic units.

A further object of my invention is to provide a mechanism of the type above set forth wherein the power take-off speed remains relatively constant throughout the entire operating speed range of the transmission mechanism. The power take-off speed is directly related to engine speed and the engine throttle position remains constant during normal operation of the tractor.

It is a further object of my invention to provide a split power drive mechanism of the type above set forth wherein the function of the hydrostatic units can be readily performed by wholly mechanical drive elements.

Further objects and advantages of my invention will become apparent from the following particular description and from the accompanying drawing wherein numeral 10 designates a transmission casing that preferably is of cast construction. The casing 10 can be flanged as shown at 12 so that it can be readily bolted to the rear end of the cylinder block for a tractor engine. Driving torque is delivered from the engine crankshaft to a transmission power input shaft 14, a suitable operator controlled friction clutch mechanism 16 being provided for this purpose. A main power output shaft is shown at 18, and it can be drivably connected to the traction wheels by a suitable drive line and axle arrangement.

The housing 10 is flanged as shown at 20, and a forward supporting wall 22 is connected to the inner periphery of flange 20. The central portion of wall 22 defines a clutch bearing support 24 which in turn provides a forward support for power input shaft 14.

Shaft 14 extends through wall 22 as indicated, and a suitable seal is provided at 26.

Housing 10 is also formed with a rearward wall 28 having a bearing opening 30 for accommodating bearing 32. One end of the shaft 18 is journaled within bearing 32 as indicated, and a suitable fluid seal 34 is provided for containing the transmission lubricant within the housing 10.

A pair of hydrostatic units 36 and 38 is carried by a housing 40 that is in turn connected to and carried by the aforementioned wall 22. The housing 40 encloses a first rotor 42 and a second rotor 44, the former being formed with cylinders 46 and the latter being formed with cylinders 48. These cylinders extend in a direction that is parallel to the direction of the axis of shaft 14.

Shaft 14 extends through a central opening in rotor 42 and is splined or otherwise positively connected thereto. Shaft 14 also extends through an opening 50 in housing 40 and is journaled by means of bearing 52 in a web 54 that forms a part of housing 10.

Piston elements 56 are slidably positioned within the cylinders 46, the latter being angularly positioned about the axis of shaft 14. The outwardly extending ends of piston elements 56 are connected to shoes 58 which are adapted to slidably engage a surface 60 of an adjustable swash plate 62. Swash plate 62 can be pivotally mounted in the housing by a suitable trunnion 64. The swash plate does not rotate.

The cylinders 48 in the rotor 44 are similarly positioned about the axis of the countershaft 66, the latter being splined or otherwise positively connected to rotor 44. Piston elements 68 are slidably positioned in the cylinders 48, and the extended ends thereof are connected by means of a ball and socket joint to shoes 70. An adjustable swash plate 72 is pivotally connected to the housing 40 and is adapted to be adjusted about the axis of the trunnion 74. Shoes 70 are slidably positioned against a cooperating bearing surface on the swash plate 72.

A positive displacement pump 73 is drivably connected to power input shaft 14. It comprises a driving gear 75 and a driven internal gear 77. The output pressure of pump 73 can be used, if desired, to actuate the adjustable swash plates 62 and 72.

The rotor 42 is formed with inlet and outlet ports and the rotor 44 is similarly formed with inlet and outlet ports, the inlet port for one unit communicating with the outlet port of the other unit, and vice versa, so that the hydraulic units 36 and 38 are situated in a closed fluid circuit. The porting and the corresponding internal passage structure has not been illustrated in the drawing.

A clutch element 76 is splined to shaft 14, and a reverse gear 78 is journaled on an extension of element 76. Reverse gear 78 is formed with external clutch teeth 80 on the hub portion thereof, and these teeth are aligned with corresponding teeth on the element 76. A clutch element 82 is slidably positioned on the element 76, and it is formed with internal clutch teeth for this purpose. Element 82 is grooved to accommodate a shifting fork 84 carried by a shifter shaft that is in turn slidably supported by bosses 88 and 90 on the interior of housing 10.

Shaft 66 extends through a cooperating opening formed in housing 40, and it has secured thereto a reverse drive gear 92 that meshes with the aforementioned gear 78. The connection between gear 92 and shaft 66 can be accomplished by a key and slot or by splines, as desired. A split sleeve 94 is received over shaft 66, and it cooperates with a bearing support 96 that is received within a bearing 98. The aforementioned web 54 is suitably apertured to receive the bearing 98 and to provide support for the shaft 66.

The bearing support 96 forms an extension of a carrier member 100 for the planetary gear unit, said gear unit further comprising a ring gear 102, planet pinions 104 carried by the carrier member 100 and a sun gear 106. The shaft 66 is connected to sun gear 106.

An external gear 108 is connected to or is integrally formed with the carrier member 100, and it is situated in meshing engagement with a gear 110 situated on the right-hand end of the power input shaft 14 as indicated.

Gear 110 is recessed to accommodate a tapered end 112 of power output shaft 18, and suitable bearing means 114 are provided between end 112 and the recess in gear 110.

An overrunning clutch element 116 is rotatably journaled about shaft 66 and is keyed or otherwise positively connected to support 96, and hence to carrier member 100. Element 116 forms an inner race for an overrunning coil type clutch comprising an expandable spring element 118, one end of which is connected to an outer race 120. An internally splined sleeve 122 is connected to race 120, and it can be adjusted in a direction parallel to the axis of shaft 66. When it is moved in a left-hand direction, as viewed in the drawing, the internal teeth for sleeve 122 engage external clutch teeth 124 formed on the hub portion of gear 92. This establishes a positive connection between race 120 and shaft 66.

Power output shaft 18 has journaled thereon a high range gear 126 and a low range gear 128, said gears being internally splined and shaft 18 being externally splined for this purpose. A clutch element 130 is situated between gears 126 and 128, and it is formed with external teeth which cooperate with internal teeth formed on a sliding clutch element 132. The hubs of gears 126 and 128 are formed with clutch teeth 134 and 136 which in turn are carried by a shifter shaft 86. When the shifter fork 138 is moved in a left-hand direction, as viewed in the drawing, the teeth in clutch element 132 engage teeth 134 thereby establishing a positive driving connection between gear 126 and shaft 18. When the element 132 is moved in a right-hand direction, teeth 136 engage the internal teeth of element 132 thereby locking gear 128 to shaft 18.

A power take-off shaft is shown in the drawing at 140, and the right-hand end thereof, as viewed in the drawing, is positioned within a bearing retainer 142 carried by the wall 28 of the housing 10. Bearing retainer 142 encloses a bearing 144 which in turn is connected to shaft 140. A suitable fluid seal is shown at 146.

Ring gear 102 is connected to a torque transfer member 148 which in turn has secured thereto a gear 150. Gear 126 meshes continuously with gear 150 as indicated. Torque transfer member 148 also has formed thereon a gear 152 which continuously meshes with gear 128. A tapered roller bearing 154 is used for journaling power take-off shaft 140 within the torque transfer member 148. Another roller bearing 156 is situated in spaced relationship with respect to bearing 154 for the purpose of journaling torque transfer member 148. Bearing 156 is retained within the bearing retainer member 142.

During operation the engine will drive shaft 14 in a counterclockwise direction when the transmission mechanism is viewed from the left-hand side with reference to the position shown in the drawing. Clutch 16 can be engaged or disengaged to establish a driving connection between shaft 14 and the engine.

In one particular embodiment of my invention, it is desirable to maintain the engine speed at approximately 1750 r.p.m. The rotary motion of shaft 14 is imparted to gear 110 which in turn drives gear 108 at a speed of 545 r.p.m. A power take-off shaft 140 is therefore driven at a constant speed of 545 r.p.m. in a counterclockwise direction.

To condition the tractor for forward drive operation in the low speed range, shifter shaft 86 is moved in a right-hand direction, as viewed in the drawing, to establish a locking connection between gear 128 and shaft 18. Since the shaft 18 is stationary under initial starting conditions, sun gear 106 and shaft 66 are caused to revolve in a counterclockwise direction at a speed of 1970 r.p.m. Hydraulic unit 38 is driven at the same speed as shaft 66, and the displacement of hydraulic unit 38 will be set at eighty-nine percent of the displacement of hydraulic unit 36. The latter is driven at the same speed as shaft 14 by reason of the driving connection between shaft 14 and rotor 42. The hydraulic units will operate at zero pressure under these conditions since no torque is being delivered to shaft 18.

If the operator now moves the controls for the hydraulic unit 38 so that the displacement of hydraulic unit 38 will increase, shaft 66 will turn in a counterclockwise direction at a lower rate of speed. When unit 38 has reached full displacement, the speed of shaft 66 is 1750 r.p.m. Since the carrier member 100 for the planetary gear unit is driven at a constant speed of 545 r.p.m., ring gear 102 and torque transfer member 148 are driven in a counterclockwise direction thereby causing power output shaft 18 to revolve in the same direction as shaft 14. Shaft 18 revolves at 23.6 r.p.m. under these conditions.

The hydraulic pressure in the closed hydraulic circuit of the hydraulic units is proportional to drawbar pull, and in one particular embodiment it is equal to 3000 p.s.i. when the drawbar pull is 3600 pounds. It will be appreciated that the power path established by the hydraulic units accommodates only a portion of the total power being distributed to shaft 18 from the engine, and the hydraulic power capacities of the hydraulic units can therefore be of a relatively reduced order of magnitude.

To increase the ground speed still further, the operator can adjust the controls for hydraulic unit 36 so that the displacement thereof is decreased. This causes unit 36 to accept less fluid. When hydraulic unit 36 reaches zero displacement, fluid transfer between the units is prevented and shaft 66 is stalled. Under these conditions the power flow path from shaft 14 to shaft 18 is fully mechanical and the over-all operating efficiency is not influenced by the efficiencies of the hydraulic units, except for leakage.

When hydraulic unit 36 is adjusted so that it assumes a negative displacement position, unit 38 is driven in a clockwise direction. This causes the speed of ring gear 102 to increase further and to overspeed the carrier member 100. When hydraulic unit 36 reaches a full negative displacement in one operating embodiment of my invention, hydraulic unit 38 will be driven counterclockwise at a speed of 1750 r.p.m. This adds 187 r.p.m. to shaft 18. The shaft speed can be increased still further by decreasing the displacement of hydraulic unit 38.

In one operating embodiment of my invention, if the displacement of hydraulic unit 38 is reduced to fifty percent of the displacement of unit 36, unit 38 will rotate at a speed of 3500 r.p.m. in a clockwise direction thus adding further to the speed of output shaft 18. This operating condition is feasible for transporting purposes, although the over-all operating efficiency is lower than that which would normally be required for continuous heavy duty operation.

To condition the transmission mechanism for reverse drive, the hydraulic units are adjusted so that the displacement of unit 38 is less than eighty-nine percent of the displacement of unit 36. Under these conditions ring gear 102 will be driven in the same direction as the direction of rotation of shaft 14, and shaft 18 will therefore be driven in the opposite direction.

To condition the transmission mechanism for operation in the high speed range, the shifter shaft 86 is moved in a left-hand direction under zero torque conditions so that clutch element 132 and clutch teeth 134 will lock gear 126 to shaft 18 while simultaneously releasing gear 128 from shaft 18. The over-all speed ratio variation is the same as the variation obtainable during operation in the low speed range although the r.p.m. of shaft 18 is greater.

To establish a fully mechanical reverse drive, the hydraulic units are adjusted to a zero torque delivery position and shifter fork 84 is moved in a left-hand direction to cause gear 78 to become locked to shaft 14. This causes gear 92 and shaft 66 to rotate in a direction opposite to the direction of rotation of shaft 14. The sun gear 106 is over-speeded under these conditions and the output shaft 18 is therefore driven in a reverse direction. Either the high range gear 126 or the low range gear 128 can be employed during reverse drive operation.

To condition the mechanism for a fully mechanical forward drive, the hydraulic units can again be adjusted to a zero torque delivery position, and clutch element 122 can be adjusted in a left-hand direction. This locks the outer clutch race 120 to gear 92 and to shaft 66. Since the sun gear 106 will tend to be over-speeded under these conditions, the outer race 120 becomes locked to inner race 116 by the one-way clutch spring 118, and this establishes a locked-up condition for the planetary gear unit, the sun gear 106 rotating in unison with the carrier member 100 and the ring gear member 102. A second forward driving speed ratio in each range can be obtained by anchoring sun gear 106. This can be accomplished by suitably positioning the swash plate for hydraulic unit 36 so that fluid distribution between the hydraulic units is interrupted. If, for example, hydraulic unit 36 is adjusted to a zero displacement position, the sun gear 106 cannot turn. The overrunning clutch spring element 118 will permit the carrier member 100, however, to over-speed sun gear 106 under these conditions. It is possible, therefore, to obtain four fully mechanical forward driving speed ratios and two fully mechanical reverse drive speed ratios.

Having thus described a preferred embodiment of my invention, what I claim and desire to secure by United States Letters Patent is:

1. In a power transmission mechanism, a power input shaft, a power output shaft, a countershaft, a planetary gear unit comprising a ring gear member, a sun gear member, a carrier member, planet gears rotatably journaled on said carrier member in meshing engagement with said sun and ring gear members, a first torque delivery gear connected to said ring gear member, a second torque delivery gear mounted about the axis of said power output shaft, said torque delivery gears being in driving relationship, means for connecting said second torque delivery gear to said power output shaft, a pair of variable displacement hydrostatic units disposed in a common, closed hydrostatic circuit, one of said hydrostatic units being drivably connected to said power input shaft, the other of said units being connected to said countershaft, with the entire discharge fluid of one hydrostatic unit circulating through the other hydrostatic unit throughout the speed ratio range, said sun gear member being connected to said countershaft, a power input gear connected to said power input shaft, means for connecting drivably said carrier member and said power input gear, and means for varying the relative displacement of said hydrostatic units whereby the speed of said sun gear member can be varied.

2. In a power transmission mechanism, a power input shaft, a power output shaft, a countershaft, a planetary gear unit comprising a ring gear member, a sun gear member, a carrier member, planet gears rotatably journaled on said carrier member of said planetary gear unit in meshing engagement with said sun and ring gear members of said planetary gear unit, a first torque delivery gear connected to a first member of said planetary gear unit, a second torque delivery gear mounted about the axis of said power output shaft, said torque delivery gears being in driving relationship, means for connecting said second torque delivery gear to said power output shaft, a pair of hydrostatic units disposed in a common, closed hydrostatic circuit, one of said units being drivably connected to said power input shaft, the other of said units being connected to said countershaft, with the entire discharge fluid of one hydrostatic unit circulating through the other hydrostatic unit throughout the speed ratio range, a second member of said planetary gear unit being connected to said countershaft, a power input gear connected to said power input shaft, means for drivably connecting a third member of said planetary gear unit to said power input gear, and means for varying the relative displacement of said hydrostatic units whereby the speed of said second member of said planetary gear unit can be varied.

3. In a power transmission mechanism, a power input shaft, a power output shaft, a planetary gear unit comprising a ring gear member, a sun gear member, a carrier member, planet gears rotatably journaled on said carrier member in meshing engagement with said sun and ring gear members, a first geared connection between a first member of said planetary unit and said power output shaft, a second geared connection between a second member of said planetary gear unit and said power input shaft, a pair of hydrostatic units, said hydrostatic units being disposed in a closed hydraulic circuit with the entire discharge fluid of one hydrostatic unit circulating through the other hydrostatic unit throughout the speed ratio range, one of said hydrostatic units being drivably connected to a third member of said planetary gear unit, the other of said hydrostatic units being connected to said power input shaft, and means for varying the relative displacement of said hydrostatic units whereby the torque reaction of said third member of said planetary gear unit can be varied.

4. In a power transmission mechanism, a power input shaft, a power output shaft, a planetary gear unit comprising a ring gear, a sun gear, a carrier member, planet gears rotatably journaled on said carrier member in meshing engagement with said sun and ring gear members, a first geared connection between said ring gear member of said planetary unit and said power output shaft, a second geared connection between said carrier member of said planetary gear unit and said power input shaft, a pair of hydrostatic units, said hydrostatic units being disposed in a closed hydraulic circuit with the entire discharge fluid of one hydrostatic unit circulating through the other hydrostatic unit throughout the speed ratio range, one of said hydrostatic units being drivably connected to the sun gear member of said planetary gear unit, the other of said hydrostatic units being connected to said power input shaft, and means for varying the relative displacement of said hydrostatic units whereby the torque reaction of said sun gear member of said planetary gear unit can be varied.

5. In a power transmission mechanism, a power input shaft, a power output shaft, a planetary gear unit comprising a ring gear member, a sun gear member, a carrier member, planet gears rotatably journaled on said carrier member in meshing engagement with said sun and ring gear members, means for establishing a high speed range geared connection between said ring gear member and said power output shaft, means for establishing a low speed range geared connection between said ring gear member and said power output shaft, a geared connection between said power input shaft and said carrier member, a pair of hydrostatic units disposed in a closed hydraulic circuit with the entire discharge fluid of one hydrostatic unit circulating through the other hydrostatic unit throughout the speed ratio range, one of said units being drivably connected to said power input shaft, the other of said hydrostatic units being connected to said sun gear member, and means for varying the relative displacements of the hydrostatic units whereby the speed of said sun gear member may be controlled to provide an infinitely variable over-all speed ratio for the transmission mechanism.

6. In a power transmission mechanism, a power input shaft, a power output shaft, a countershaft, a planetary gear unit comprising a ring gear member, a sun gear member, a carrier member, a power take-off shaft connected to said carrier member, said power take-off shaft being directly related to the speed of said power input shaft, planet gears rotatably journaled on said carrier member in meshing engagement with said sun and ring gear members, a first torque delivery gear connected to said ring gear member, a second torque delivery gear engaged with said first torque delivery gear mounted about the axis of said power output shaft, means for connecting said second torque delivery gear to said power output shaft, a pair of hydrostatic units, one of said units being drivably connected to said power input shaft, the other of said units being connected to said countershaft, said hydrostatic units being disposed in a closed hydraulic circuit, said sun gear member being connected to said countershaft, a power input gear connected to said power input shaft, a third torque delivery gear connected to said carrier member in driving relationship with respect to said power input gear, and means for varying the relative displacement of said hydrostatic units whereby the speed of said sun gear member can be varied.

7. In a power transmission mechanism, a power input shaft, a power output shaft, a countershaft, a planetary gear unit comprising a ring gear member, a sun gear member, a carrier member, a power take-off shaft connected to said carrier member, said power take-off shaft being directly related to the speed of said power input shaft, planet gears rotatably journaled on said carrier member in meshing engagement with said sun and ring gear members, a first torque delivery gear connected to a first member of said planetary gear unit, a second torque delivery gear mounted about the axis of said power output shaft, said torque delivery gears being in driving relationship, means for connecting said second torque delivery gear to said power output shaft, a pair of hydrostatic units, one of said units being drivably connected to said power input shaft, the other of said units being connected to said countershaft, said hydrostatic units being disposed in a closed hydraulic circuit, a second member of said planetary gear unit being connected to said countershaft, a power input gear connected to said power input shaft, means for drivably connecting a third member of said planetary gear unit to said power input gear, and means for varying the relative displacement of said hydrostatic units whereby the speed of said second member of said planetary gear unit can be varied.

8. In a power transmission mechanism, a power input shaft, a power output shaft, a planetary gear unit comprising a ring gear member, a sun gear member, a carrier member, a power take-off shaft connected to said carrier member, said power take-off shaft being directly related to the speed of said power input shaft, planet gears rotatably journaled on said carrier member in meshing engagement with said sun and ring gear members, a first geared connection between one member of said planetary unit and said power output shaft, a second geared connection between a second member of said planetary gear unit and said power input shaft, a pair of hydrostatic units, said hydrostatic units being disposed in a closed hydraulic circuit, one of said hydrostatic units being drivably connected to a third member of said planetary gear unit, the other of said hydrostatic units being connected to the third member of said planetary gear unit, and means for varying the relative displacement of said hydrostatic units whereby the torque reaction on said third member of said planetary gear unit can be varied.

9. In a power transmission mechanism, a power input shaft, a power output shaft, a planetary gear unit comprising a ring gear member, a sun gear member, a carrier member, a power take-off shaft connected to said carrier member, said power take-off shaft being directly related to the speed of said power input shaft, planet gears rotatably journaled on said carrier member in meshing engagement with said sun and ring gear members, a first geared connection between said ring gear member of said planetary unit and said power output shaft, a second geared connection between said sun gear member of said planetary gear unit and said power input shaft, a pair of hydrostatic units, said hydrostatic units being disposed in a closed hydraulic circuit, one of said hydrostatic units being drivably connected to the sun gear member of said planetary gear unit, the other of said hydrostatic units being connected drivably to the carrier member of said planetary gear unit, and means for varying the relative displacement of said hydrostatic units whereby the torque reaction on said carrier member of said planetary gear unit can be varied.

10. In a power transmission mechanism, a power input shaft, a power output shaft, a planetary gear unit comprising a ring gear member, a sun gear member, a carrier member, a power take-off shaft connected to said carrier member, said power take-off shaft being directly related to the speed of said power input shaft, planet gears rotatably journaled on said carrier member in meshing engagement with said sun and ring gear members, means for establishing a high speed range geared connection between said ring gear member and said power output shaft, means for establishing a low speed range geared connection between said ring gear member and said power output shaft, a geared connection between said power input shaft and said carrier member, a pair of hydrostatic units disposed in a closed hydraulic circuit, one of said hydrostatic units being drivably connected to said power input shaft, the other of said hydrostatic units being connected to said sun gear member, and means for varying the relative displacements of the hydrostatic units whereby the speed of said sun gear member may be controlled to provide an infinitely variable over-all speed ratio for the transmission mechanism.

11. In a power transmission mechanism, a power input shaft, a power output shaft, a planetary gear unit comprising a ring gear member, a sun gear member, a carrier member, planet gears rotatably journaled on said carrier member in meshing engagement with said sun and ring gear members, a first geared connection between a first member of said planetary unit and said power output shaft, a second geared connection between a second member of said planetary gear unit and said power input shaft, a pair of hydrostatic units, said hydrostatic units being disposed in a closed hydraulic circuit, one of said hydrostatic units being drivably connected to a third member of said planetary gear unit, the other of said hydrostatic units being connected to said power input shaft, means for varying the relative displacement of said hydrostatic units whereby the torque reaction of said third member of said hydrostatic unit can be varied, an overrunning clutch comprising an inner race and an outer race, an overrunning clutch element situated between said races, means for connecting one race to said second member of said gear unit, and means for conneciting the other race to another member of said gear unit, said overrunning clutch being adapted to clutch two members of said gear unit together to establish a first over-all driving speed ratio and to accommodate relative motion therebetween when a reaction force is applied to said other member of said gear unit.

12. In a power transmission mechanism, a power input shaft, a power output shaft, a planetary gear unit comprising a ring gear member, a sun gear member, a carrier member, planet gears rotatably journaled on said carrier member in meshing engagement with said sun and ring gear members, a first geared connection between a first member of said planetary unit and said power output shaft, a second geared connection between a second member of said planetary gear unit and said power input shaft, a pair of hydrostatic units, said hydrostatic units being disposed in a closed hydraulic circuit, one of said hydrostatic units being drivably connected to a third member of said planetary gear unit, the other of said hydrostatic units being connected to said power input shaft, means for varying the relative displacement of said hydrostatic units whereby the torque reaction of said third member of said planetary gear unit can be varied, an overrunning clutch comprising an inner race and an outer race, an overrunning clutch element situated between said races, means for connecting one race to said second member of said gear unit, means for connecting the other race to said third member of said gear unit, said overrunning clutch being adapted to clutch the second and third members of said gear unit together to establish a first over-all driving speed ratio and to accommodate relative motion therebetween when a reaction force is applied to said third member of said gear unit, and means for establishing a geared connection between said power input shaft and said third member of said gear unit to condition said mechanism for fully mechanical reverse drive operation.

13. In a power transmission mechanism, a power input shaft, a power output shaft, a planetary gear unit comprising a ring gear member, a sun gear member, a carrier member, planet gears rotatably journaled on said carrier member in meshing engagement with said sun and ring gear members, a first geared connection between said ring gear member of said planetary unit and said power output shaft, a second geared connection between said carrier member of said planetary gear unit and said power input shaft, a pair of hydrostatic units, said hydrostatic units being disposed in a closed hydraulic circuit, one of said hydrostatic units being drivably connected to the sun gear member of said planetary gear unit, the other of said hydrostatic units being connected to said power input shaft, means for varying the relative displacement of said hydrostatic units whereby the torque reaction of the sun gear member of said hydrostatic unit can be varied, an overrunning clutch comprising an inner race and an outer race, an overrunning clutch element situated between said races, means for connecting one race to one member of said gear unit, and means for connecting the other race to another member of said gear unit, said overrunning clutch being adapted to clutch said one and said other members of said gear unit together to establish a first over-all ratio of speeds of rotation of said power input shaft and said power output shaft and to accommodate relative motion therebetween when a reaction force is applied to said other member of said gear unit.

14. In a power transmission mechanism, a power input shaft, a power output shaft, a planetary gear unit comprising a ring gear member, a sun gear member, a carrier member, planet gears rotatably journaled on said carrier member in meshing engagement with said sun and ring gear members, a first geared connection between said ring gear member of said planetary unit and said power output shaft, a second geared connection between said sun gear member of said planetary gear unit and said power input shaft, a pair of hydrostatic units, said hydrostatic units being disposed in a closed hydraulic circuit, one of said hydrostatic units being drivably connected to the sun gear member of said planetary gear unit, the other of said hydrostatic units being connected to said power input shaft, means for varying the relative displacement of said hydrostatic units whereby the torque reaction of said carrier member of said hydrostatic unit can be varied, an overrunning clutch comprising an inner race and an outer race, an overrunning clutch element situated between said races, means for connecting one race to one member of said gear unit, means for connecting the other race to another member of said gear unit, said overrunning clutch being adapted to clutch two members of said gear unit together to establish a first over-all driving speed ratio and to accommodate relative motion therebetween when a reaction force is applied to said other member of said gear unit, and means for establishing a geared connection between said power input shaft and said other member of said gear unit to condition said mechanism for reverse drive operation.

References Cited in the file of this patent

UNITED STATES PATENTS

| | | |
|---|---|---|
| 940,626 | Walser | Nov. 16, 1909 |
| 2,332,436 | Campbell | Oct. 19, 1943 |
| 2,485,126 | Wood | Oct. 18, 1949 |
| 2,838,940 | Swenson | June 17, 1958 |